United States Patent
Ray

(10) Patent No.: US 9,500,757 B2
(45) Date of Patent: *Nov. 22, 2016

(54) METHOD AND SYSTEM FOR TRANSMISSION OF SEISMIC DATA

(71) Applicant: Fairfield Industries Incorporated, Sugar Land, TX (US)

(72) Inventor: Clifford H. Ray, Fulshear, TX (US)

(73) Assignee: FAIRFIELD INDUSTRIES, INC., Sugar Land, TX (US)

( * ) Notice: Subject to any disclaimer, the term of this patent is extended or adjusted under 35 U.S.C. 154(b) by 281 days.

This patent is subject to a terminal disclaimer.

(21) Appl. No.: 14/218,386

(22) Filed: Mar. 18, 2014

(65) Prior Publication Data
US 2014/0198616 A1 Jul. 17, 2014

Related U.S. Application Data

(60) Continuation of application No. 13/531,187, filed on Jun. 22, 2012, now Pat. No. 8,681,584, which is a division of application No. 12/381,606, filed on Mar. 13, 2009, now Pat. No. 8,228,759, which is a continuation-in-part of application No. 11/438,168, filed on May 22, 2006, now Pat. No. 7,983,847, which is a continuation of application No. 10/719,800, filed on Nov. 21, 2003, now Pat. No. 7,124,028.

(51) Int. Cl.
*G01V 1/22* (2006.01)
*H04Q 9/00* (2006.01)

(52) U.S. Cl.
CPC ............. *G01V 1/22* (2013.01); *G01V 1/223* (2013.01); *H04Q 9/00* (2013.01); *H04Q 2209/43* (2013.01)

(58) Field of Classification Search
CPC .... G01V 1/223; G01V 1/22; H04Q 2209/43; H04Q 9/00
USPC .......................................................... 367/77
See application file for complete search history.

(56) References Cited

U.S. PATENT DOCUMENTS

| | | |
|---|---|---|
| 1,706,066 A | 3/1929 | Karcher |
| 3,886,494 A | 5/1975 | Kostelnicek et al. |
| 4,042,905 A | 8/1977 | Fort et al. |
| 4,042,906 A | 8/1977 | Ezell |
| 4,072,923 A | 2/1978 | Siems et al. |
| 4,583,206 A | 4/1986 | Rialan et al. |

(Continued)

FOREIGN PATENT DOCUMENTS

| | | |
|---|---|---|
| AU | 2004202911 | 7/2004 |
| EP | 1 622 305 A1 | 2/2006 |

(Continued)

OTHER PUBLICATIONS

Canadian Office Action dated May 27, 2013 issued in connection with Canadian Application No. 2,547,062, 3 pages.

(Continued)

*Primary Examiner* — Ian J Lobo
(74) *Attorney, Agent, or Firm* — Foley & Lardner LLP; James De Vellis

(57) ABSTRACT

The transmission system combines a self-contained, wireless seismic acquisition unit and a wireless, line of site, communications unit to form a plurality of individual short-range transmission networks and also a mid-range, line of sight transmission network.

20 Claims, 2 Drawing Sheets

(56) References Cited

U.S. PATENT DOCUMENTS

| | | |
|---|---|---|
| 4,663,744 A | 5/1987 | Russell et al. |
| 4,666,338 A | 5/1987 | Schoepf |
| 4,815,044 A | 3/1989 | Deconinck et al. |
| 4,823,326 A | 4/1989 | Ward |
| 4,885,724 A | 12/1989 | Read et al. |
| 4,908,803 A | 3/1990 | Rialan |
| 4,914,636 A | 4/1990 | Garrotta |
| 4,979,152 A | 12/1990 | Rialan et al. |
| 4,992,787 A | 2/1991 | Helm |
| 5,124,956 A | 6/1992 | Rice et al. |
| 5,253,223 A | 10/1993 | Svenning et al. |
| 5,327,399 A | 7/1994 | Asada et al. |
| 5,412,623 A | 5/1995 | Asada et al. |
| 5,550,787 A | 8/1996 | Rialan et al. |
| 5,623,455 A | 4/1997 | Norris |
| 5,706,250 A | 1/1998 | Rialan et al. |
| 5,712,828 A | 1/1998 | Luscombe et al. |
| 5,724,241 A | 3/1998 | Wood et al. |
| 5,822,273 A | 10/1998 | Bary et al. |
| 5,827,273 A | 10/1998 | Edwards |
| 5,886,255 A | 3/1999 | Aronstam |
| 5,910,763 A | 6/1999 | Flanagan |
| 5,950,133 A | 9/1999 | Bledsoe |
| 6,002,640 A | 12/1999 | Harmon |
| 6,070,129 A | 5/2000 | Grouffal et al. |
| 6,078,283 A | 6/2000 | Bednar |
| 6,169,476 B1 | 1/2001 | Flanagan |
| 6,208,247 B1 | 3/2001 | Agre et al. |
| 6,219,620 B1 | 4/2001 | Park et al. |
| 6,226,601 B1 | 5/2001 | Longaker |
| 6,229,486 B1 | 5/2001 | Krile |
| 6,285,955 B1 | 9/2001 | Goldwasser |
| 6,353,577 B1 | 3/2002 | Orban et al. |
| 6,430,106 B1 | 8/2002 | Staron |
| 6,443,228 B1 | 9/2002 | Aronstam et al. |
| 6,549,834 B2 | 4/2003 | McClellan et al. |
| 6,580,751 B1 | 6/2003 | Gardner et al. |
| 6,832,251 B1 | 12/2004 | Gelvin et al. |
| 6,859,831 B1 | 2/2005 | Gelvin et al. |
| 6,883,638 B1 | 4/2005 | Maxwell et al. |
| 6,999,377 B2 | 2/2006 | Burkholder et al. |
| 7,085,196 B2 | 8/2006 | Nemeth |
| 7,124,028 B2 | 10/2006 | Ray et al. |
| 7,218,890 B1 | 5/2007 | Iseli et al. |
| 7,254,093 B2 | 8/2007 | Ray et al. |
| 7,269,095 B2 | 9/2007 | Chamberlain et al. |
| 7,274,907 B1 | 9/2007 | Perotti et al. |
| 7,298,671 B2 | 11/2007 | Brinkmann et al. |
| 7,310,287 B2 | 12/2007 | Ray et al. |
| 7,453,768 B2 | 11/2008 | Hall et al. |
| 7,489,932 B2 | 2/2009 | Chari et al. |
| 7,505,735 B2 | 3/2009 | Miyoshi |
| 7,535,795 B2 | 5/2009 | Varsamis et al. |
| 7,573,782 B2 | 8/2009 | Barakat |
| 7,630,332 B1 | 12/2009 | Elliott |
| 7,660,203 B2* | 2/2010 | Barakat ............... G01V 1/247 367/63 |
| 7,773,457 B2 | 8/2010 | Crice et al. |
| 7,891,004 B1 | 2/2011 | Gelvin et al. |
| 7,920,507 B2 | 4/2011 | Elliott |
| 7,983,847 B2 | 7/2011 | Ray et al. |
| 8,027,225 B2 | 9/2011 | Kamata et al. |
| 8,199,611 B2 | 6/2012 | Goujon |
| 8,217,803 B2 | 7/2012 | El-Hamamsy et al. |
| 8,228,757 B2 | 7/2012 | Beffa et al. |
| 8,228,759 B2* | 7/2012 | Ray .................... G01V 1/223 367/77 |
| 8,238,197 B2 | 8/2012 | Crice et al. |
| 8,238,198 B2 | 8/2012 | Crice |
| 8,238,199 B2 | 8/2012 | Elder et al. |
| 8,296,068 B2 | 10/2012 | Ray et al. |
| 8,335,128 B2 | 12/2012 | Iseli |
| 8,364,127 B2 | 1/2013 | Roy et al. |
| 8,407,008 B2 | 3/2013 | Pavel et al. |
| 8,605,545 B2 | 12/2013 | Crice et al. |
| 8,605,547 B2 | 12/2013 | Ray et al. |
| 8,614,928 B2 | 12/2013 | Kooper et al. |
| 8,618,934 B2 | 12/2013 | Belov et al. |
| 8,644,111 B2 | 2/2014 | Ray et al. |
| 8,681,584 B2* | 3/2014 | Ray .................... G01V 1/223 367/77 |
| 2003/0012168 A1 | 1/2003 | Elson et al. |
| 2003/0063585 A1 | 4/2003 | Younis et al. |
| 2003/0128627 A1 | 7/2003 | Iseli et al. |
| 2003/0174582 A1 | 9/2003 | Scott |
| 2004/0121786 A1 | 6/2004 | Radcliffe et al. |
| 2004/0252585 A1 | 12/2004 | Smith et al. |
| 2005/0114033 A1 | 5/2005 | Ray et al. |
| 2005/0122231 A1 | 6/2005 | Varaiya et al. |
| 2005/0141562 A1 | 6/2005 | Chen et al. |
| 2005/0238058 A1 | 10/2005 | Peirce et al. |
| 2005/0271006 A1 | 12/2005 | Chari et al. |
| 2005/0276162 A1 | 12/2005 | Brinkmann et al. |
| 2006/0044940 A1 | 3/2006 | Hall et al. |
| 2006/0212226 A1 | 9/2006 | Ray et al. |
| 2006/0239301 A1 | 10/2006 | Drange |
| 2006/0291327 A1 | 12/2006 | Barakat |
| 2007/0030345 A1 | 2/2007 | Amling et al. |
| 2008/0049550 A1 | 2/2008 | Fleure et al. |
| 2008/0049554 A1 | 2/2008 | Crice et al. |
| 2008/0062815 A1 | 3/2008 | Iseli |
| 2009/0103394 A1 | 4/2009 | Ronnow |
| 2009/0154289 A1 | 6/2009 | Johansen |
| 2009/0184841 A1 | 7/2009 | Gardiner |
| 2010/0008185 A1 | 1/2010 | Moldoveanu |
| 2010/0195439 A1 | 8/2010 | Muyzert |
| 2010/0214871 A1 | 8/2010 | Souders et al. |
| 2010/0305895 A1 | 12/2010 | Drange |
| 2010/0318299 A1 | 12/2010 | Golparian et al. |
| 2011/0012728 A1 | 1/2011 | McCane et al. |
| 2011/0096628 A1 | 4/2011 | Golparian |
| 2011/0110193 A1 | 5/2011 | Elder et al. |
| 2011/0149686 A1 | 6/2011 | Ray et al. |
| 2011/0242933 A1 | 10/2011 | Maissant et al. |
| 2012/0039329 A1 | 2/2012 | Sun et al. |
| 2012/0275269 A1 | 11/2012 | Ray |
| 2012/0300586 A1 | 11/2012 | Ray et al. |

FOREIGN PATENT DOCUMENTS

| | | |
|---|---|---|
| GB | 2 434 718 A | 8/2007 |
| KR | 20020059876 A | 7/2002 |
| KR | 20020094418 A | 12/2002 |
| RU | 959211 A1 | 9/1982 |
| RU | 2091820 C1 | 9/1997 |
| RU | 2207593 | 6/2003 |
| WO | WO-01/26068 | 4/2001 |
| WO | WO-2005/057237 A2 | 6/2005 |
| WO | WO-2008/033969 | 3/2008 |

OTHER PUBLICATIONS

Final Office Action dated Apr. 1, 2013 in corresponding U.S. Appl. No. 13/296,329, filed Nov. 15, 2011, 14 pages.
Final Office Action dated Feb. 5, 2008 in corresponding U.S. Appl. No. 11/438,168, filed May 22, 2006, 12 pages.
Final Office Action dated Jul. 22, 2010 in corresponding U.S. Appl. No. 11/438,168, filed May 22, 2006, 8 pages.
Final Office Action dated Nov. 22, 2005 in corresponding U.S. Appl. No. 10/719,800, filed Nov. 21, 2003, 4 pages.
International Preliminary Report on Patentability for Application No. PCT/US04/027049 dated Feb. 22, 2006, 6 pages.
International Preliminary Report on Patentability for Application No. PCT/US04/027049 dated Sep. 13, 2011, 9 pages.
International Preliminary Report on Patentability for Application No. PCT/US04/030871 dated May 22, 2006, 4 pages.
International Search Report for Application No. PCT/US04/027049 dated Apr. 11, 2005, 1 page.
International Search Report for Application No. PCT/US04/027049 dated Mar. 24, 2011, 5 pages.
International Search Report for Application No. PCT/US04/30871 dated Aug. 8, 2005, 1 page.

(56) References Cited

OTHER PUBLICATIONS

Lindsey et al., "Data Gathering Algorithims in Sensor Networks Using Energy Metrics", IEEE Transactions on Parallel and Distributed Systems, vol. 13, No. 9, Sep. 2002, pp. 924-935.
Non-Final Office Action dated Apr. 15, 2005 in corresponding U.S. Appl. No. 10/719,800, filed Nov. 21, 2003, 5 pages.
Non-Final Office Action dated Apr. 2, 2009 in corresponding U.S. Appl. No. 11/438,168, filed May 22, 2006, 12 pages.
Non-Final Office Action dated Aug. 15, 2008 in corresponding U.S. Appl. No. 11/438,168, filed May 22, 2006, 14 pages.
Non-Final Office Action dated Dec. 12, 2011 in corresponding U.S. Appl. No. 12/381,606, filed Mar. 13, 2009, 9 pages.
Non-Final Office Action dated Jul. 10, 2013 in corresponding U.S. Appl. No. 13/531,187, filed Jun. 22, 2012, 7 pages.
Non-Final Office Action dated Jul. 19, 2013 in corresponding U.S. Appl. No. 13/296,329 dated Jul. 19, 2013, 8 pages.
Non-Final Office Action dated Jul. 5, 2007 in corresponding U.S. Appl. No. 11/438,168, filed May 22, 2006, 11 pages.
Non-Final Office Action dated Jun. 20, 2005 in corresponding U.S. Appl. No. 10/719,800, filed Nov. 21, 2003, 9 pages.
Non-Final Office Action dated May 3, 2012 in corresponding U.S. Appl. No. 13/296,329, filed Nov. 15, 2011, 8 pages.
Non-Final Office Action dated Nov. 15, 2012 in corresponding U.S. Appl. No. 13/569,990, filed Aug. 8, 2012, 6 pages.
Non-Final Office Action dated Nov. 30, 2009 in corresponding U.S. Appl. No. 11/438,168, filed May 22, 2006, 5 pages.
Non-Final Office Action dated Oct. 22, 2012 in corresponding U.S. Appl. No. 13/531,187, filed Jun. 22, 2012, 11 pages.
Non-Final Office Action dated Oct. 24, 2011 in corresponding U.S. Appl. No. 13/035,665, filed Feb. 25, 2011, 13 pages.
Non-Final Office Action dated Sep. 22, 2010 in corresponding U.S. Appl. No. 11/438,168, filed May 22, 2006, 14 pages.
Notice of Allowance dated Apr. 12, 2012 in corresponding U.S. Appl. No. 13/035,665, filed Feb. 15, 2011, 7 pages.
Notice of Allowance dated Aug. 8, 2013 in corresponding U.S. Appl. No. 13/296,329, filed Nov. 15, 2011, 6 pages.
Notice of Allowance dated Sep. 13, 2013 in corresponding U.S. Appl. No. 13/569,990, filed Aug. 8, 2012, 17 pages.
U.S. Notice of Allowance dated Nov. 7, 2013 in corresponding U.S. Appl. No. 13/531,187, filed Jun. 22, 2012, 11 pages.
"Digiseis-FLX radio telemetry acquisition system," Schlumberger Geco-Prakla, 10 pages (date unavailable).
"Digiseis-FLX radio telemetry acquisition system," Schlumberger Geco-Prakla, Feb. 20, 1996 (5 pages).
Office Action in Canadian Application No. 2,547,062 dtd Nov. 7, 2014 (3 pages).
"dispose," The Free Dictionary, 2015, downloaded Feb. 22, 2015 from http://www.thefreedictionary.com/dispose, 6pp.
Non-Final Office Action in U.S. Appl. No. 14/518,791 dated Mar. 3, 2015 (19 pages).
Canadian Office Action on 2547062 dated Sep. 4, 2015.
US Office Action on U.S. Appl. No. 14/518,791 dated Sep. 18, 2015.
"MRU User's Manual, Software version 2.0", Sercel, Documentation Part No. 0311355, issued on Jan. 2002, 98 pages.
"SCM Theory of Operations", 296 pages.
"Wireless Seismic, Inc.'s Invalidity Contentions Pursuant to Local Patent Rule 3-3", Case No. 2:13-cv-903-JRG-RSP, in the United States District Court of the Eastern District of Texas Marshall Division, Filed Jun. 12, 2014, 3767 pages.
Agre, J. et al., "Development Platform for Self-Organizing Wireless Sensor Networks," SPIE Conf. on Unattended Ground Sensor Techs and Applications, vol. 3713, Apr. 1999, 10 pages.
Akyildiz, I. F. et al., "Challenges for Efficient Communication in Underwater Acoustic Sensor Networks," Sigbed, vol. 1, No. 2, Jul. 2004, 6 pages.
Akyildiz, I.F. et al., "A Survey on Sensor Networks," IEEE Comms. Mag., Aug. 2002, pp. 102-114.
Akyildiz, I.F. et al., "Wireless Sensor Networks: a Survey," Computer Networks, vol. 38, 2002, pp. 393-422.

Andra, S.K.C., "Tracking Phenomena with Sensor Networks," Electronic Thesis or Dissertation, University of Cincinnati, Jan. 24, 2005, 82 pages.
ANSI/IEEE Std 802.11, "Part 11: Wireless LAN Medium Access Control (MAC) and Physical Layer (PHY) Specifications," 1999 Edition, 528 pages.
Beffa, M. et al., "Very High Speed Ordered Mesh Network of Seismic Sensors for Oil and Gas Exploration," Mobile Adhoc and Sensor Systems, 2007. MASS 2007. IEEE International Conference on Oct. 8-11, 2007, 5 pages.
Bremner, D. et al., "Seismic Acquisition Near a Large Compressor Plant," SEG Technical Program Expanded Abstracts 1992, downloaded on Apr. 29, 2014, pp. 681-682.
Buttyan, L. et al., "Spontaneous Cooperation in Multi-Domain Sensor Networks," Security and Privacy in Ad-hoc and Sensor Networks, Springer Berlin Heidelberg, 2005, pp. 42-53.
Chen, Y.P. et al., "Energy-Efficient Data Aggregation Hierarchy for Wireless Sensor Networks," Quality of Service in Heterogeneous Wired/Wireless Networks, 2005. Second International Conference on Aug. 22-24, 2005, 8 pages.
Clare, L.P. et al., "Self-Organizing Distributed Sensor Networks," Proc. SPIE 3713, Unattended Ground Sensor Technologies and Applications, Jul. 30, 1999, 9 pages.
Cui, J-H. et al., "Challenges: Building Scalable and Distributed Underwater Wireless Sensor Networks (UWSNs) for Aquatic Applications," UCONN CSE Technical Report, Sep. 2005, 17 pages.
Culler, D. et al., "MICA: The Commercialization of Microsensor Motes," Sensors, Apr. 1, 2002, printed on May 8, 2014, 5 pages.
Dai, H. et al., "TSync: A Lightweight Bidirectional Time Synchronization Service for Wireless Sensor Networks," Sigmobile, Jan. 2004, 12 Pages.
Data Collector Table of Contents Schematics and Assemblies, Dec. 1, 1988 2 pages.
Deng, J. et al., "Intrusion Tolerance and Anti-Traffic Analysis Strategies for Wireless Sensor Networks," 2004 International Conference on Dependable Systems and Networks, Jun. 28-Jul. 1, 2004, 10 pages.
Ergen, S. et al., "TDMA Scheduling Algorithms for Sensor Networks," Berkeley University, Jul. 2, 2005, 12 pages.
Giannakis, G.B. et al., "Wideband Generalized Multi-Carrier CDMA over Frequency-Selective Wireless Channels", Acoustics, Speech, and Signal Processing, 2000. ICASSP '00. Proceedings. 2000 IEEE International Conference on Jun. 5-9, 2000, vol. 5, pp. 2501-2504.
Haartsen, J.C. et al., "Bluetooth—A New Low Power Radio Interface Providing Short Range Connectivity," Proceedings of the IEEE, vol. 88, No. 10, Oct. 2000, pp. 1651-1661.
Input/Output Inc., "I/O System Two: Seismic Telementry Dat AcQuisition System," SPEC-MRX-XXE, Printed in USA, 1991, 1992, and 1993, 20 pages.
Input/Output, Inc., "The I/O System: Equipment Installation Guide—Table of Contents," 55 pages.
Input/Output, Inc., "Archiver Operator's Manual," Apr. 1998, 28 pages.
Input/Output, Inc., "Contents," Apr. 7, 1998, 58 pages.
Input/Output, Inc., "Customer Support Hotline," 1 page.
Input/Output, Inc., "DCU Operator's Manual," Apr. 1998, 82 pages.
Input/Output, Inc., "End-User License Agreement Input/Output, Inc. Land Systems Manual CD/ROM," 3 pages.
Input/Output, Inc., "Field of Service Bulletin," Aug. 13, 1989, 88 pages.
Input/Output, Inc., "Humidity Sensor Drawings," Sep. 30, 1990, 2 pages.
Input/Output, Inc., "I/O Bill of Materials," Report date Jul. 27, 1998, 3066 pages.
Input/Output, Inc., "I/O Land Systems Manuals—Schematics and Assemblies," 1 page.
Input/Output, Inc., "I/O System One: Central Electronic Diagnostics Manual," Oct. 1990, 176 pages.
Input/Output, Inc., "I/O System Two: Performance Manual," Jul. 1997, 273 pages.
Input/Output, Inc., "I/O System Two: Land System Field Deployment," Jun. 1998, 83 pages.

(56) References Cited

OTHER PUBLICATIONS

Input/Output, Inc., "I/O System Two: OCM—Hardware and Software Set-Up Procedure," May 1998, 34 pages.
Input/Output, Inc., "I/O System Two: RSR Cables Manual Table of Contents," 1 page.
Input/Output, Inc., "I/O System Two: RSX Frequency Response Generator—Operations," Jun. 1998, 5 pages.
Input/Output, Inc., "Land Bird-Dog Training—Course Curriculum", 1 page.
Input/Output, Inc., "RSR Operations Manual", Apr. 9, 1998, 388 pages.
Input/Output, Inc., "RTS Operator's Manual," Mar. 1998, 208 pages.
Input/Output, Inc., "System II Central Electronics Maintenance—Course Curriculum," 1 page.
Input/Output, Inc., "System II MRX 3-Day Maintenance—Course Curriculum," 1 page.
Input/Output, Inc., "System II MRX/ALX/MLX Maintenance—Course Curriculum," 1 page.
Input/Output, Inc., "System II Operations Course Curriculum," 1 page.
Input/Output, Inc., "System II RSR Maintenance—Course Curriculum," 1 page.
Input/Output, Inc., "System II RSR Operations—Course Curriculum," 1 page.
Input/Output, Inc., "The I/O Land System," 1 page.
Input/Output, Inc., "The I/O System—Operations Manual," Aug. 1997, 627 pages.
Input/Output, Inc., "The I/O System—Tape Header Format," Sep. 1998, 17 pages.
Input/Output, Inc., "The I/O System Two: LIM Theory of Operations", 340 pages.
Input/Output, Inc., "Training for the I/O Land System," 1 page.
Intanagonwiwat, C. et al., "Directed Diffusion: A Scalable and Robust Communication Paradigm for Sensor Networks", MobiCom '00 Proceedings of the 6th annual international conference on Mobile computing and networking, Boston, MA, Aug. 2000, pp. 56-67.
Kim, S.H. et al., "Frequency-Hopped Multiple-Access Communication with Multicarrier On-Off Keying in Rayleigh Fading Channels", IEEE Transactions on Communications, vol. 48, No. 10, Oct. 2000, pp. 1692-1701.
Leguay, J. et al., "An Efficient Service Oriented Architecture for Heterogeneous and Dynamic Wireless Sensor Networks", Local Computer Networks, 2008. LCN 2008. 33rd IEEE Conference on Oct. 14-17, Montreal, Que, 2008, 8 pages.
Lewis, F.L., "Wireless Sensor Networks," The University of Texas at Arlington, 2004, 18 pages.
Lynch, J. et al., "A Summary Review of Wireless Sensors and Sensor Networks for Structural Health Monitoring", The Shock and Vibration Digest, vol. 38, No. 2, Mar. 2006, pp. 91-128.
McCarthy, J. et al., "Data Report for the 1991 Bay Area Seismic Imaging Experiment (Basix)", U.S. Department of the Interior U.S. Geological Survey, Menlo Park, CA 09025, 1993, 26 pages.
Milanovic, N. et al., "Bluetooth Ad-Hoc Sensor Network", Proc. 2002 International Conference Advances in Infrastructure for e-Business, e-Education, e-Science, and e-Medicine on the Internet, Scuola Superiore G. Reiss Romoli, 2002, 4 pages.
Olarui, S., "Information Assurance in Wireless Sensor Networks", ODU Sensor Network Research Group, 50 pages.
Park, J. T. "Management of Ubiquitous Sensor Network", APNOMS 2005 Tutorial, Okinawa, Japan, 73 pages.
Poor, R. et al., "Reliable Wireless Networks for Industrial Systems", Ember Corporation, Boston, MA, May 2004, 19 pages.
Porter, J. et al., "Wireless Sensor Networks for Ecology", BioScience, vol. 55, No. 7, Jul. 2005, pp. 561-572.
Ringwald, M. et al., "BurstMAC—An Efficient Mac Protocol for Correlated Traffic Bursts", Networked Sensing Systems (INSS), 2009 Sixth International Conference, Pittsburgh, PA, Jun. 17-19, 2009, 9 pages.

Savazzi, S. et al., "Short-range Wireless Sensor Networks for High Density Seismic Monitoring", Proc. of WWRF 22th meeting May 5-7 2009, Paris, France, 5 pages.
Savazzi, S. et al., "Synchronous Ultra-Wide Band Wireless Sensors Networks for Oil and Gas Exploration", Computers and Communications, 2009, ISCC 2009, IEEE symposium on Jul. 5-8, 2009, pp. 907-912.
Sensoria, "Wireless Integrated Networks Sensors (WINS) Next Generation", Defense Advanced Research Projects Agency, AFRL-IF-RS-TR-2004-58 Final Technical Report, Mar. 2004, 65 pages.
Sercel, "408UL Reference Training Guide, Chapter 5, Vibroseis Operations," Last modification Jun. 15, 2000, 72 pages.
Sercel, 408UL Reference Training Guide, Chapter 1, Training Course Overview, Last modification on Oct. 11, 2000, 29 pages.
Sercel, "408UL Reference Training Guide, Chapter 101, UNIX, Issue: Jun. 26, 2000, 44 pages.
Sercel, "408UL Reference Training Guide, Chapter 102, Communications Networks," Issue: Jun. 26, 2000, 28 pages.
Sercel, "408UL Reference Training Guide, Chapter 104, Radiocommunications, Part 1: Antenna Management," Issue: Jun. 26, 2000, 61 pages.
Sercel, "408UL Reference Training Guide, Chapter 201, Glossary," Issue: Jun. 26, 2000, 8 pages.
Sercel, 408UL Reference Training Guide, Chapter 2a, Seismic Areal Network (except Radio Equipment: Refer to Chap. 2b), Last Modification: Jan. 5, 2001, 100 pages.
Sercel, "408UL Reference Training Guide, Chapter 2-b, Seismic Areal Network, Radio Equipment," Last modification: Jan. 5, 2001, 44 pages.
Sercel, 408UL Reference Training Guide, Chapter 3, Seismic Software Network, last modification on Jun. 15, 2000, 34 pages.
Sercel, "408UL Reference Training Guide, Chapter 4, 408UL Control Module Hardware," last modification on Oct. 17, 2000, 52 pages.
Sercel, "408UL Reference Training Guide, Chapter 6, Real Time Positioning," last modification: Jan. 25, 2001, 75 pages.
Sercel, "408UL Reference Training Guide, Chapter 7, SPS APS Files Management," Last modification: Nov. 2, 2000, 36 pages.
Sercel, "408UL Reference Training Guide, Chapter 8, On Line Seismic Quality Control SQC-Pro," Last modification: Dec. 1, 2000, 40 pages.
Sercel, "408UL Reference Training Guide, Chapter 9, 408UL Field Know-How," Issue: Jun. 26, 2000, 16 pages.
Sercel, "408UL Reference Training Guide," Issue: Jan. 2001, 4 pages.
Sercel, "408UL Technical Manual CMXL V7.1," Apr. 2003, 406 pages.
Sercel, "408UL User's Manual, vol. 1, CMXL V6.1, CM408 V6.0," Jan. 2002, 652 pages.
Sercel, "408UL User's Manual, vol. 1, CMXL V7.1," Jan. 2003, 710 pages.
Sercel, "408UL User's Manual, vol. 2, CMXL V7.1," Apr. 2003, 234 pages.
Sercel, "408UL: Installation Manual CMXL V7.1," Mar. 2003, 402 pages.
Sercel, "408UL: User's Manual vol. 3 CMXL V7.1," May 2003, 338 pages.
Table of Contents Schematics and Assemblies CTR, 1 page.
Tian, J. et al., "Multi-Channel Seismic Data Synchronizing Acquisition System Based on Wireless Sensor Network", Networking, Sensing and Control, 2008. ICNSC 2008. IEEE International Conference, Apr. 6-8, 2008, pp. 1269-1272.
US Office Action dated Jul. 18, 2014 on U.S. Appl. No. 14/280,318.
US Office Action dated Jun. 10, 2014 on U.S. Appl. No. 14/258,654.
US Office Action dated Jun. 23, 2014 on U.S. Appl. No. 14/100,940.
US Office Action dated Jun. 23, 2014, on U.S. Appl. No. 14/261,102.
US Office Action for U.S. Appl. No. 14/258,620 Dtd Jun. 5, 2014.
US Office dated Jul. 30, 2014 on U.S. Appl. No. 14/273,303.

(56) References Cited

OTHER PUBLICATIONS

Werner-Allen, G. et al., "Deploying a Wireless Sensor Network on an Active Volcano", IEEE Internet Computing, vol. 10, No. 2, Mar.-Apr. 2006, pp. 18-25.
Wilden, J. et al., "Position and Orientation for Distributed Sensors: The PODIS Network", Proceedings of the MSS Symposium on Battlefield Acoustics, Laurel, MD Sep. 2004, Aug. 24, 2004, 16 pages.
Xu, N. et al., "A Wireless Sensor Network for Structural Monitoring," SenSys '04, Proceedings of the 2nd international conference on Embedded networked sensor systems, Nov. 3-5, 2004, Baltimore, MD, 12 pages.
US Office Action on U.S. Appl. No. 14/100,916 dated Mar. 4, 2016.
US Office Action on U.S. Appl. No. 14/218,175 dated Mar. 4, 2016.
US Notice of Allowance on U.S. Appl. No. 14/100,916 dated May 31, 2016.

\* cited by examiner

METHOD AND SYSTEM FOR TRANSMISSION OF SEISMIC DATA

CROSS-REFERENCES TO RELATED APPLICATIONS

This application claims a benefit of priority under 35 U.S.C. §120 as a continuation of U.S. patent application Ser. No. 13/531,187, filed on Jun. 22, 2012, now U.S. Pat. No. 8,681,584, which claims a benefit of priority under 35 U.S.C. §120 as a divisional of U.S. patent application Ser. No. 12/381,606, filed Mar. 13, 2009, now U.S. Pat. No. 8,228,759, which claims a benefit of priority under 35 U.S.C. §120 as a continuation-in-part of U.S. patent application Ser. No. 11/438,168 filed on May 22, 2006, now U.S. Pat. No. 7,983,847, which claims a benefit of priority under 35 U.S.C. §120 as a continuation of U.S. patent application Ser. No. 10/719,800, filed on Nov. 21, 2003, now U.S. Pat. No. 7,124,028, each of which are incorporated herein by reference in their entirety.

FIELD OF THE INVENTION

The present invention relates to seismic data acquisition, and more particularly to a method and system for transmitting data and control signals between multiple remote stations in an array. Most particularly, the invention relates to a seismic data collection system utilizing multiple, wireless, self-contained, seismic recording units or pods each having an associated wireless communications unit in close, but detached proximity thereto, the wireless communications unit having both short range and mid-range transmission capabilities.

DESCRIPTION OF THE RELATED ART

Seismic exploration generally utilizes a seismic energy source to generate an acoustic signal that propagates into the earth and is partially reflected by subsurface seismic reflectors (i.e., interfaces between subsurface lithologic or fluid layers characterized by different elastic properties). The reflected signals are detected and recorded by seismic units having receivers or geophones located at or near the surface of the earth, thereby generating a seismic survey of the subsurface. The recorded signals, or seismic energy data, can then be processed to yield information relating to the lithologic subsurface formations, identifying such features, as, for example, lithologic subsurface formation boundaries.

Typically, the seismic units or stations are laid out in an array, wherein the array consists of a line of stations each having at least one geophone attached thereto in order to record data from the seismic cross-section below the array. For data over a larger area and for three-dimensional representations of a formation, multiple lines of stations may be set out side-by-side, such that a grid of receivers is formed. Often, the stations and their geophones are remotely located or spread apart. In land seismic surveys for example, hundreds to thousands of geophones may be deployed in a spatially diverse manner, such as a typical grid configuration where each line of stations extends for 5000 meters with stations spaced every 25 meters and the successive station lines are spaced 200 meters apart.

Various seismic data transmission systems are used to connect remote seismic acquisition units to a control station. Generally, the seismic stations are controlled from a central location that transmits control signals to the stations and collects seismic and other data, such as quality control data, back from the stations. Alternatively, the seismic stations may transmit data back to an intermediate data collection station such as a concentrator, where the data is recorded and stored until retrieved. Whichever the case, the various stations are most commonly hard wired to one another utilizing data telemetry cable. In the case of systems deployed in a marine environment, such cabling may be clad to withstand high pressure and corrosion. Commonly, cable telemetry is used for data transmission between the individual receivers, the stations and the central location. Other systems use on-board, wireless data transmission systems for communications and data transmission. Still other systems temporarily store the data at each station until the data is extracted.

In the case of wired stations, typically several geophones are connected in a parallel-series combination on a single twisted pair of wires to form a single receiver group or channel for a station. During the data collection process, the output from each channel is digitized and recorded by the station for subsequent analysis. In turn, stations are usually connected to cables used to communicate with and transport the collected data to recorders located at either a control station or a concentrator station.

In the case of wireless seismic units, each unit utilizes mid-range or long range radio transmission to communicate with either a central control station or concentrator via a transmitter on-board the seismic unit. Transmissions are made either directly between a seismic unit and the control station or directly between a seismic unit and the concentrator. To the extent the transmissions are high power, long-range signals, such as between a seismic acquisition unit and a central control station, the transmissions generally require a license from the local governing authority. Units capable of such transmissions also have higher power requirements and thus require larger battery packages. To the extent the seismic acquisition units transmit to a concentrator station utilizing a low power, mid-range signal, the transmitting and receiving units must typically have a line of site therebetween.

Those skilled in the art will understand that in order to enhance detection of seismic energy within the earth, it is necessary to maximize ground coupling between the earth and the seismic systems, and particularly the geophones of the system. Thus, it is desirable to position seismic units directly in contact with the ground and preferably, maximize the surface area of contact between the seismic unit and the ground. Moreover, it is also desirable to minimize noise that can arise from various external sources, such as wind, by minimizing the profile of the seismic unit, and specifically the height of the seismic unit as it deployed on the ground. In this regard, even an antenna projecting from the seismic unit will be subject to cross-winds and the like, thereby resulting in noise in the collected seismic energy.

One drawback to low-profile seismic units placed on the ground is that their capability of wirelessly communicating with external systems is greatly reduced, particularly if it is a line-of-sight system such as described above. This is particularly true if the seismic unit is fully or partially buried in the ground. In addition to the presence of a physical structure in the line of site between the unit and a receiver, other factors that can inhibit transmissions are a weak signal, weather conditions, topography, interference from other electrical devices operating in the vicinity of the unit, or disturbance of the unit's deployment position.

Thus, it would be desirable to provide a communication system for a seismic survey array that has flexibility in wirelessly transmitting signals and data to and from remote seismic units and a control and/or data collection station.

The system should be capable of communication between functional seismic units even if one or more intermediate stations fail to operate properly. In addition, the system should be capable of communication between functional seismic units even if a change in environmental or physical conditions inhibits or prevents a direct transmission between a remote unit and its control station. The system should maximize wireless transmission capability while minimizing the possibility of noise from external sources. Similarly, the system should maximize coupling between the system and the earth.

SUMMARY OF THE INVENTION

The present invention provides a system for collecting seismic data utilizing multiple, wireless, self-contained seismic data sensor units. Each individual seismic unit is self contained such that all of the electronics are disposed within the case, including one or more geophones, a power source, a local clock and a very short range wireless transmitter/receiver. In addition, associated with each individual seismic unit is a wireless communications unit in close proximity to, but decoupled from the seismic unit, the wireless communications unit having a power source, a short range wireless transmitter/receiver for communicating with the seismic unit and a transmitter/receiver for communicating with other removed wireless systems.

Preferably, each seismic unit is disposed for burying just below the surface of the ground. In this regard, each seismic unit may be cylindrical in shape and the electronics for the seismic unit are housed in a sealed cylindrical package. Likewise, each wireless communications unit is disposed to be planted in the ground adjacent a seismic unit and project up from the ground. Each wireless communications unit is preferably formed of an elongated, rigid support structure such as a pole, shaft or the like. A low power, short range wireless transmitter/receiver is carried on the structure. At a first end of the structure is a spike or similar feature to permit the structure to be readily and easily affixed to, "planted" in or otherwise secured to the ground, while at a second end of the rigid structure is mounted a low power, mid-range, line of sight wireless transmitter/receiver. A power source may likewise be carried on or otherwise associated with the support structure.

In another embodiment, a global positioning system unit is also carried on the support structure, preferably at or near the second end.

In one embodiment of the invention, a single transceiver is utilized in place of a separate transmitter and receiver set. Moreover multiple sets of transmitters and receivers for different range transmissions may be replaced with a single transceiver with two power ranges. Such a transceiver may be utilized on the support structure rather than separate short-range and mid-range transmitters/receivers, wherein a first power setting permits the transceiver to be utilized as a short-range device, and a second power setting permits the transceiver to be utilized as a mid-range device.

The method according to the invention transmits radio signals between individual seismic acquisition units in an array, such that the transmissions can be passed in a relay chain through the array of seismic units. The transmission between individual seismic units is enhanced by the wireless communications units of the invention. Preferably, each seismic unit is disposed in the ground so as to have a very low exposed profile. In one embodiment, each seismic unit is buried in the ground several inches below the top soil so as to have no exposed profile. A wireless communications unit is deployed in the ground adjacent each seismic unit, preferably a short distance away from the buried seismic unit. The wireless communications unit and the adjacent seismic unit communicate with one another utilizing the very short range transmission system. The wireless communications unit then communicates with other wireless communications units, satellites or other wireless receivers utilizing longer, mid-range wireless radio transmissions. The elongated length of the support structure permits the transceiver of the wireless communications unit to be raised above the ground to facilitate communicate with more remote wireless radio receivers, while the very short range transmission system permits communications between the wireless communications unit and the adjacent seismic unit.

Utilizing the seismic unit and wireless communications unit wirelessly coupled to one another, multiple seismic acquisition units within the array are capable of passing transmissions to multiple other seismic units, even if the line of site on the ground between seismic units may be inhibited. More specifically, any one seismic acquisition unit/wireless communications unit in the array is capable of transmitting radio signals to several other seismic acquisition unit/wireless communications units positioned within the line of sight, radio range of the transmitting system. A network of radio-linked seismic acquisition systems such as this permits data and control signal transmission routes back to and from a control station to be varied as desired or needed. In other words, the transmission path utilized to transmit data and control signals from and to the individual seismic acquisition systems (wherein a "system" is a single seismic acquisition unit and associated wireless communications unit) in an array may be altered. In transmissions up the chain, i.e., from the most remote seismic acquisition system to the control station, each system receives data from a seismic system "down" the chain and transmits the received data up the chain along with any data that may be locally stored on a system. Preferably, as one or more transmissions move up one or more chains, it is bounced between seismic acquisition systems so as to be relayed by each system in the array. The specific transmission path, i.e., a particular "chain" of systems, for any given transmission may vary between transmissions depending on overall requirements of the array. Control signals, such as timing signals and the like, can be passed back down the chain along the same or a different transmission path.

At least one and preferably a plurality of seismic acquisition systems in the network are located in the proximity of the control station so that the network can utilize mid-range radio frequency to transmit seismic data all the way back to the control station. In another embodiment of the invention, the control station is remotely located from the seismic systems and one or more concentrators are located in the proximity of the seismic acquisition systems of the network so that the network can utilize mid-range radio frequency to transmit seismic/QC and other data to the concentrators. The concentrators, in-turn, can store the data and/or transmit it back as desired to a control station.

Within the transmission network, there are multiple transmission paths from the most remote seismic system to the control station/concentrator. The particular transmission path to be used for any given transmission will be determined based on the strength of the signal between communicating antennas, the operational status of a seismic system and path efficiency. In this regard, it should be noted that while a seismic unit forming part of a seismic system may not be operational, its associated wireless communications unit may still function as a way point for conveying a transmission along a path since the wireless communications unit of a system operates under its own power separate from its associated seismic unit.

DETAILED DESCRIPTION

In the detailed description of the invention, like numerals are employed to designate like parts throughout. Various items of equipment, such as fasteners, fittings, etc., may be omitted to simplify the description. However, those skilled in the art will realize that such conventional equipment can be employed as desired.

Figure 1:
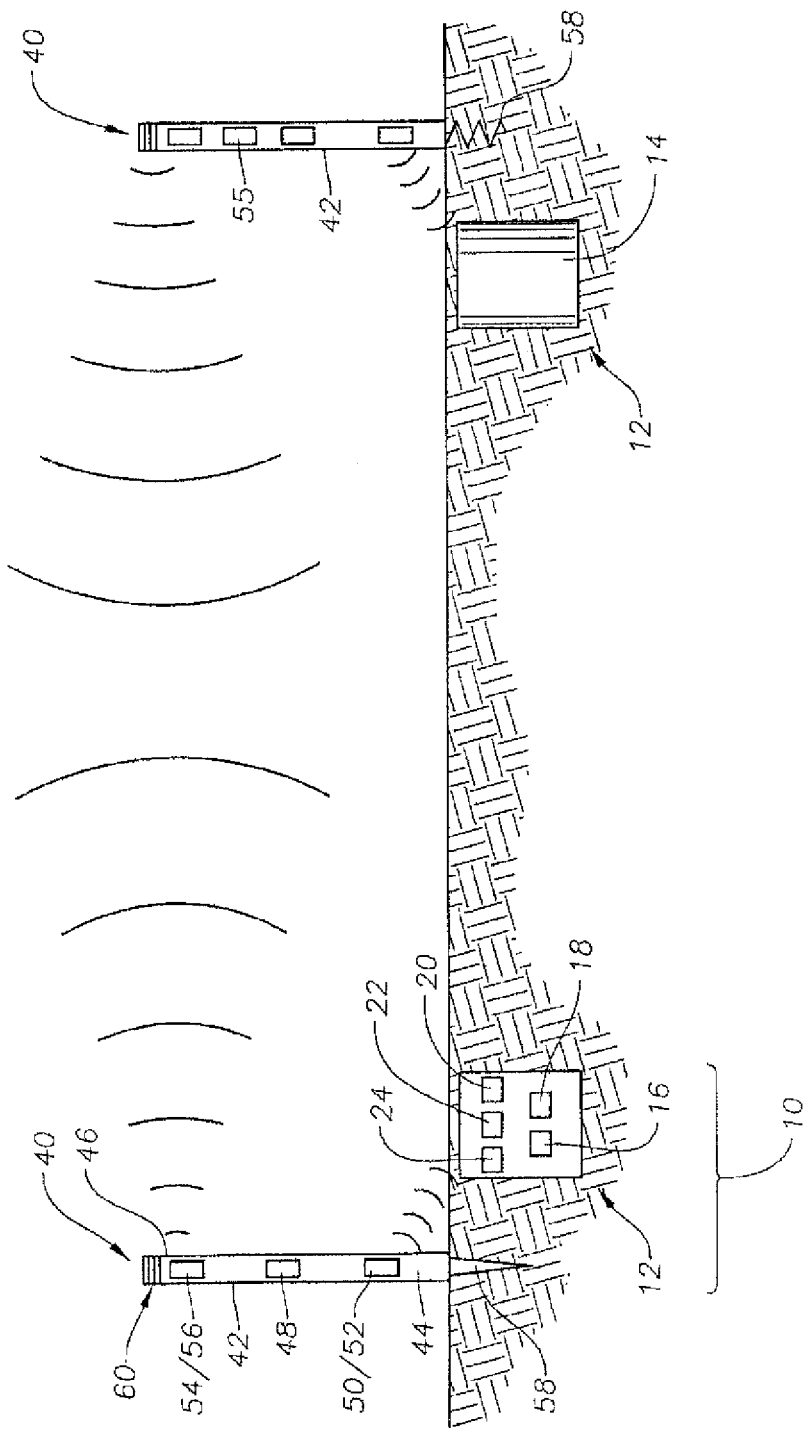
FIG. 1 is a side view of a seismic acquisition system contemplated by the invention.

With reference to FIG. 1, there is shown a seismic data acquisition system 10 comprised of a seismic data acquisition unit 12 and a low power, wireless communications unit 40. Seismic acquisition unit 12 is generally comprised of a case 14 in which is mounted a power source 16, a short-range transmitter 18, a short-range receiver 20 and at least one geophone 22. Control electronics 24, which may include long term or short term memory for storing seismic data and the like, may also be included in the case. Preferably, unit 12 is self-contained so that all electrical components are disposed within case 14, requiring no external wiring of any type. In this regard, seismic unit 12 is wirelessly linked to wireless communications unit 40 via transmitter 18 and receiver 20. Notably, while the descriptions of preferred embodiments are intended to describe a system where an external antenna is decoupled from the seismic unit 12, those skilled in the art will appreciate that seismic unit 12 may still include an internal antenna, such as may be provided for operation in conjunction with a transmitter and/or receiver chip set, for short-range communications as described herein.

Wireless communications unit 40 generally comprises an elongated support structure 42 having a first end 44 and a second end 46. Mounted on support structure 42 are electrical components, including a power source 48, a short-range transmitter 50 configured to wirelessly communicate with the short-range receiver 20 within case 14, a short-range receiver 52 configured to wirelessly communicate with the short-range transmitter 18 within said case 14, a mid-range radio transmitter 54 and a mid-range radio receiver 56.

Preferably, case 14 is cylindrical in shape so that it can easily be buried in the ground as described below. Likewise, case 14 is preferably water-tight. As such, while it is generally described for use on land, unit 14 may be deployed in wet environments and transition zone environments.

Support structure 42 is preferable an elongated rod or pole. Disposed at the first end 44 of support structure 42 is a mechanism 58 for engaging the earth. Mechanism 58 may include, but is not limited to, a spike or an auger. In other embodiments, mechanism 58 may include a cylinder or other structure that mounts in the ground and is disposed for receipt of end 44. In yet another embodiment, first end 44 of support structure 42 may be configured to engage a stake placed in the ground, such as a surveyor's stake. It is common in the industry to deploy survey stakes over a proposed area for an array prior to deployment, thereby identifying a general vicinity for deployment of a seismic unit 12. By providing a support structure 42 that can simply be engaged with a pre-deployed surveyor's stake, the time required to deploy wireless antenna 40 is reduced.

Support structure 42 may be solid, hollow or partially hollow. In one preferred embodiment, support structure 42 is a pole with a portion that is at least partially hollow for receipt of one or more of the electrical components such that the electrical components are protected from the outside environment. At the second end 46, support structure 42 may include a mechanism 60 for manipulating support structure 42, such as one or more grooves, apertures, threads or the like, thereby permitting one to manipulate support structure to permit mechanism 58 to engage the earth.

As described below, the respective mid-range transmitters/receivers of each wireless communications unit 40 communicate with each other based on line-of-sight transmission. Thus, while no particular length for support structure 42 is required for the invention, the length of support structure 42 should be of sufficient dimension to permit line-of-sight transmissions in the environment in which the wireless communications units 40 are deployed. In one embodiment, support structure 42 is approximately 3-4 feet in length.

In one preferred embodiment, mid-range radio transmitter 54 and receiver 56 are located adjacent second end 46, thereby enhancing transmission range when support structure 42 is engaged with the earth, while short-range transmitter 50 and receiver 52 are positioned nearer to first end 44, so as to be closer to the ground and closer to seismic unit 12.

One or more geophones 22 may be mounted in case 12. Geophones 22 may be single component or multi-component, i.e., capable of obtaining seismic energy in multiple axes. As used herein, the term geophone is used to refer to any device capable of detecting energy propagated through the earth, and may include, without limitation, traditional geophones, accelerometers, geophysical measuring transducers, MEMS, devices for measuring geophysical properties, and the like.

Preferably, control electronics 24 include a processor, analog board and memory. Memory may be long term, non-volatile in the event of power loss, preferably of a size or capacity to record seismic data from a series of seismic shoots over an extended period of time, such as days or weeks.

As used herein, in one embodiment, "short-range" receivers, transmitters, transceivers and transmissions are used to refer to activity in approximately the 2.4 GHz radio frequency band or otherwise used in low power, wireless personal area networks (WPANs). Those skilled in the art will appreciate that frequencies in this general range are unlicensed and generally functional over short distances of approximately 50 feet or less. Frequency hopping spread spectrum radio technology is preferably utilized in one embodiment of the invention, and in particular, wireless protocols such as the non-limiting examples of Bluetooth. In another embodiment of the invention, small, low-power digital radios based on the IEEE 802.15.4 standard for WPANs may be used, such as those based on the ZigBee standard. Systems based on the ZigBee standard are desirable because they are targeted at radio-frequency (RF) applications that require a low data rate, long battery life, and secure networking. The foregoing is preferred not only because of its short distance functionality, but also because of its low power requirements. Notwithstanding the foregoing, other short distance, low power radio systems may also be employed, such as RFID systems.

In another embodiment of the invention, "short-range" receivers, transmitters, transceivers and transmissions are used to refer to devices that uses Long Wave (LW) magnetic signals to send and receive short (~128 byte) data packets in a local regional network using IEEE 1902.1 protocol commonly called RuBee. IEEE 1902.1 RuBee uses magnetic waves, also often called inductive communication, for transmission. Additionally, RuBee uses a low frequency (~131 kHz) carrier. Although this results in a comparatively slow (~1,200 baud) transfer rate relative to other packet based network data standards, the ~131 kHz operating frequency provides RuBee with the advantages of ultra low power consumption (battery life measured in years), and normal operation near steel and/or water, thereby permitting a seismic data acquisition system as described herein to be deployed in costal transition zones and similar "wet" environments.

As used herein, "mid-range" receivers, transmitters and transmissions are used to refer to activity in approximately the 2.4 GHz radio frequency band operating under line-of-sight conditions for communicating units. Again, those skilled in the art will appreciate that frequencies in this general range are unlicensed and functional over distances of approximately one kilometer. Any standard mid-range radio transmission equipment may be utilized. One non-limiting example being wireless fidelity ("Wi-Fi") equipment, where transmission parameters may be selected to provide signal carrier modulation schemes such as complementary code keying (CCK)/packet binary convolution (PBCC) or direct sequence spread-spectrum (DSSS) or multi-carrier schemes such as orthogonal frequency division multiplexing (OFDM) and code division multiple access (CDMA).

While receivers and transmitters have been described separately herein, it will be appreciated that the foregoing may be combined in a single transceiver as is well known in the industry. As such, any reference to a transmitter and receiver pair herein may be replaced by a transceiver in accordance with the descriptions herein.

Further, a receiver, transmitter or transceiver may be provided with adjustable power ranges for transmission, and as such, can be switched between short-range transmission and mid-range transmission. In this embodiment, for example, wireless communication unit 40 may be provided with a single transceiver that can be toggled between a mid-range power setting for communicating with other wireless communication units and a low-range power setting for communicating with a seismic unit 12 wirelessly coupled to said communication unit 40.

Those skilled in the art will appreciate that the electrical requirements of wireless communications unit 40, and in particular, WPANs operating under IEEE 802.15.4 or IEEE 1902.1 RuBee standard, are much less than seismic data acquisition unit 12, and as such, the operation of wireless communications unit 40 can be accomplished with minimal power. For this reason, power source 48 may be physically very small. In one embodiment of the invention, power source 48 comprises one or more 1.5 Volt ("Double AA") batteries, a solar cell or the like.

Power savings can also be realized by placing the transmitters, receivers and/or transceivers in a low power or "sleep" mode during periods of inactivity. In one embodiment of the invention, it is contemplated that a timing signal will periodically be broadcast out to the seismic array over the mid-range network. A transceiver is maintained in a low power state except during a time window in which the timing signal is broadcast to the array. During this period or time window, the transceiver toggles to a higher power state in order to receive the timing signal. Once the timing signal has been received via the mid-range network by the wireless communication unit 40 and transmitted to its associated seismic acquisition units 12 via the short-range network, the transceiver can revert back to the low power state until the time window for the next timing signal transmission.

Power source 48 may include a rechargeable battery. In such an embodiment, a charging system may be included as a component of power source 48. Non-limiting examples of such a charging system include systems capable of generating a charge based upon movement of the structure on which the recharging system is mounted. Thus, in the instant case, movement of the support structure 42 under wind or due to other vibrations, could be utilized to generate a power charge utilizing the recharging system. Likewise a recharging system provided in a seismic unit 12 may utilize ground vibrations or seismic energy to effectuate a charge.

Power source 16 for seismic unit 12 may be internally or externally mounted relative to case 14.

In another embodiment of the invention a global positioning system ("GPS") receiver 55 is carried by support structure 42. Location and timing information may then be conveyed to seismic unit 12 utilizing the short-range transmission network. Other timing systems may likewise be incorporated as part of wireless communications unit 40 in order to provide control signals, such as master timing signals, to seismic unit 12 via the short-range network. Such timing signals may include a periodic timing code, heartbeat or beacon signal transmitted over the network of the system. Preferably, any of the foregoing timing systems are low power in nature and capable of operating utilizing power source 48.

Figure 2:
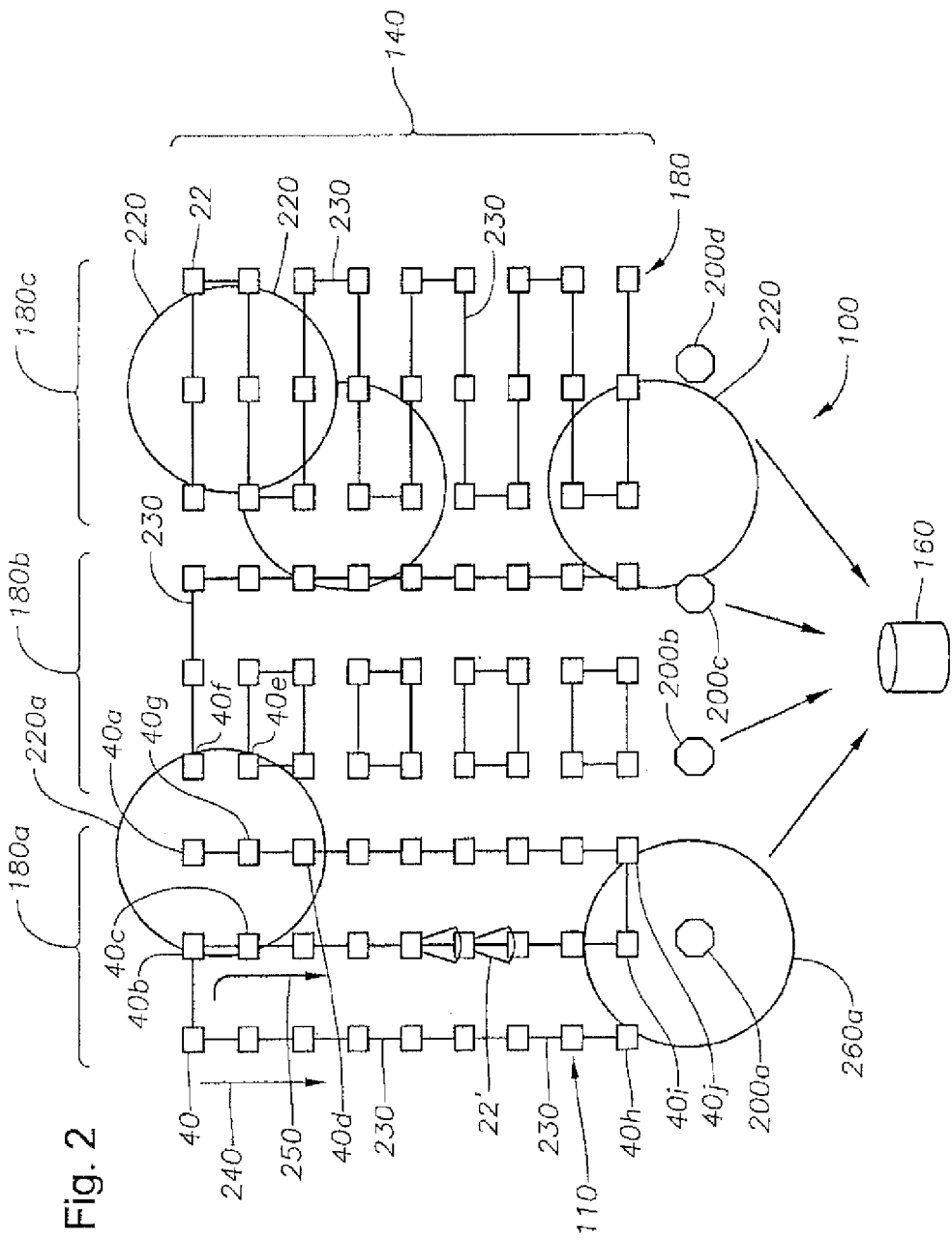
FIG. 2 is a top view of a seismic acquisition array illustrating possible transmission paths between seismic acquisition unit strings in the array.

The short range transmitters and receivers of each individual seismic data acquisition system 10 form a short-range seismic data transmission network between an individual seismic data acquisition system 10 and an associated wireless communications unit 40. Multiple seismic data acquisition system 10 can be deployed in an array, such as is shown in FIG. 2. As such, the array 100 consists of a multiplicity of short-range seismic data transmission networks as well as an overall mid-range network formed of the transmitters and receivers of said multiple seismic data acquisition systems 10.

During deployment, each seismic unit 12 is placed in contact with the ground, forming a coupling therebetween so as to enhance seismic signal detection. Likewise, each wireless communications unit 40 is secured to the ground adjacent its respective seismic unit 12. Specifically, each wireless communications unit 40 is vertically positioned so as to protrude or project up from the ground, the unit 40 being fixed to the ground by way of engagement mechanism 58. Preferably, wireless communications unit 40 is placed sufficiently close to its seismic unit 12 so as to permit short-range transmissions therebetween, but far enough removed from seismic unit 12 so as not to cause interference with the operation of seismic unit 12. For example, such interference could take the form of movement of communications unit 40, such as by wind, that could result in the creation of unwanted seismic noise in the vicinity of the communications unit 40. In the preferred embodiment, wireless communications unit 40 is positioned within 2-5 feet of its associated seismic unit 12.

While seismic unit 12 may simply be placed on the ground, preferably it is partially or fully buried in the ground. Those skilled in the art will appreciate that by burying seismic unit 12 in the ground, not only is coupling with the ground enhanced so as to yield a better fidelity signal, but the profile of seismic unit 12 is reduced, thereby minimizing the potential for environmental interference with the operation of seismic unit 12, such as noise from wind, rain or tampering. Preferably, seismic unit 12 is fully buried in the ground, with several inches of topsoil placed over it. The short-range wireless networks disclosed herein will operate through the top soil. Soil types and soil conditions dictate the depth a seismic unit 12 can be buried and continue to communicate over the short-range network with its associated wireless communications unit 40. For example, it has been found that in wet sand, a unit 12 can be buried up to 12 inches below the surface and continue to maintain short-range contact. In either case, since seismic unit 12 has no external antenna, there is nothing protruding from seismic unit 12 that could result in noise.

In one preferred embodiment, the case 14 of seismic unit 12 is cylindrical in shape so that seismic unit 12 can be readily buried in the ground. A simple cylindrical hole need be dug in the ground utilizing any standard tool, such as an auger or a post-hole shovel. Those skilled in the art will appreciate that a round hole such as this is the most expedient and simplest to dig, especially utilizing the standard tools available, thereby reducing the labor necessary to deploy seismic unit 12.

A wireless communications unit 40 and its adjacent seismic unit 12 communicate with one another utilizing the very short range transmission system described herein. The wireless communications unit 40 then communicates with other wireless communications units 40 via mid-range, line-of-sight radio transmissions. The elongated length of the support structure 42 of each wireless communications unit 40 permits the mid-range transmitters and receivers to be raised above the surface of the ground to facilitate longer distance line-of-sight communications with other systems, while the very short range transmission system permits communications between the wireless communications unit and the adjacent seismic unit.

In one preferred embodiment, the low power, wireless communications units 40 permit the transmission of radio signals between individual seismic acquisition systems 10, i.e., a seismic acquisition unit 10 and a wireless communications unit 40, of an array, such that the transmissions can be passed in a relay chain through the array utilizing the wireless communications units 40. In other words, the transmission between individual seismic systems 10 is enhanced by the wireless communications units 40, while removing potential noise that is typically associated with antenna projecting from prior art seismic units. In another embodiment, a plurality of wireless communications units 40 can simply relay a signal without regard to, or even a need for, an associated seismic acquisition unit 12.

In yet another embodiment of the invention, each individual seismic data acquisition system 10 is comprised of a seismic data acquisition unit 12 having a short-range receiver based on IEEE 1902.1 RuBee. The associated wireless communication unit 40 is likewise provided with a short-range transmitter based on IEEE 1902.1 RuBee, along with a GPS. In this embodiment, the wireless communication unit 40 does not include any mid-range or long range transmission equipment as described herein. Rather, a timing signal is received by the GPS directly from the GPS satellite and is transmitted over the magnetic transmission network to the seismic data acquisition unit 12. This permits the seismic data acquisition unit 12 to be deployed in water or under a top layer of soil or under foliage or similar cover without sacrificing the ability to communicate with the GPS satellite, an ability that might otherwise be impeded if the GPS were mounted in the seismic data acquisition unit 12 itself. Further, such an arrangement permits the wireless communication unit 40 to be physically decoupled from the seismic data acquisition unit 12, thereby enjoying the benefits described herein.

As shown in FIG. 2, in the foregoing transmission method, a transmission network 100 is comprised of a plurality of seismic acquisition systems 110 spread out in a seismic array 140 and controlled by control station 160. Each acquisition system 110 is comprised of a seismic data acquisition unit 10 and a low power, wireless communications unit 40. Array 140 is formed of multiple lines 180 of acquisition systems 110. Radio transmissions, and in particular, seismic data, quality control data, timing signals and/or control signals, are passed from wireless communications unit 40 to wireless communications unit 40 as the transmission is bounced through the network 100 to or from control station 160. In one embodiment of network 100, concentrators 200 are disposed between array 140 and control station 160. While the invention will be described in more detail with references to transmission of timing signals out to the network from a control station 160, those skilled in the art will understand that the invention encompasses any type of transmissions to or from a seismic unit, including, without limitation, control transmissions, seismic data or quality control data.

With respect to the timing signal, it is contemplated that a timing signal will be broadcast to the array periodically during time windows so as to permit the seismic acquisition units 12 to be synchronized with a master clock. By utilizing such a synchronization method, low power, low cost, temperature compensated crystal oscillators can be utilized as the local timing device in the individual seismic units 12, thereby reducing cost and power requirements for the seismic units 12.

Each wireless communications unit 40 preferably has an omnidirectional transmission range 220 and can form a wireless link 230 with multiple communications units 40. As shown, within the transmission range 220 of a unit 40, there are multiple other communications units 40 capable of receiving the transmission, in essence forming a local area network comprised of midrange wireless communications units 40. For example, unit 40a has an omnidirectional transmission range 220a. Falling within the transmission range 220a of communications unit 40a are communications units 40b-40g. With the flexibility to transmit to multiple communications units 40 each having the ability to receive and transmit seismic data to multiple other communications units 40 within the array 140, each communications unit 40 within array 140 is presented with multiple paths for communicating seismic data back to control station 160. For example, communications unit 40' can transmit seismic or QC data back to control station 160 by sending it along path 240, along path 250 or along some other path as determined by the requirements of network 100. Likewise, a timing signal can be sent along the same or different paths to communications unit 40' from control station 160.

In another embodiment, a transmitting communications unit 40 may utilize directional transmitter such that transmissions are substantially unidirectional and made only to one or more communications units 40 in a limited direction. It is common in the art to utilize phased antenna arrays—an array consisting of two or more antenna to achieve transmission directionality and gain improvement. In these types of antenna arrangements, various adjustable antenna parameters, such as phase, can be altered to control directionality and gain, and hence, transmission range. Thus, for purposes of this description, "unidirectional" means a transmission with a higher gain along one axis or in a limited direction, whereas "omni-directional" means a transmission with generally the same gain in substantially 360°. This will maintain the flexibility to transmit to multiple communications units in the direction the transmitting antenna is pointed, while reducing the number of path options that need to be processed by the overall system, thereby multiple paths to be transmitted on the same frequency at the same time without interfering with one another. In addition, a higher gain in a single or limited direction can be achieved without the need for additional power, or alternatively, power requirements can be decreased, and thus battery life extended, while maintaining the same gain as an omnidirectional signal.

In the illustration of FIG. 2, array 140 is shown as being comprised of three seismic acquisition system strings 180a, 180b, and 180c. Each string 180a, 180b, and 180c illustrates a different potential transmission path defined by wireless links 230 between the wireless communication units 40 within a string. Those skilled in the art will understand that the indicated wireless links 230 are for illustrative purposes only and, for purposes of the invention, a "string" 180 of seismic acquisition systems 110, and hence corresponding communications units 40, for a particular transmission path is defined by the selected transmission path by which data is communicated from one unit 40 to another. Thus, for any given array 140, a "string" of units may be constantly changing between transmissions. Such an arrangement permits transmissions to be rerouted in the event of some failure of a unit 40 within the string. Likewise, transmissions can be rerouted in the event of a weak signal between units 40 or to overcome topographic or other obstacles that could interfere with short range, line of site transmissions. Furthermore, in addition some failure of a unit 40, it may be desirable to reroute a transmission simply because of the operational status of a unit. For example, a unit 40 with lower battery power may be utilized downstream at the end of a string and avoided as a transmission relay further upstream in order to conserve the unit's batteries, i.e., upstream relay units require more power to relay the transmission because of the cumulative size of the transmissions.

In the event multiple adjacent strings are desired, radio transmission parameter assignments may be made to minimize interference with other transmissions and permit reuse of the same transmission parameters. For example, string 180a may transmit data at a first set of radio transmission parameters while string 180b may transmit data at a second set of parameters. Since the transmissions from a sting 180 are short range, it may only be necessary for adjacent strings to utilize different transmission parameters, depending on the array spread. In this regard, the physical seismic unit layout of a portion of array 140 defined as a string 180 may be dependent on the midrange transmission capabilities of the communications units 40 in the adjacent string. Non-adjacent strings utilizing the same string are sufficiently spaced apart so as not to interfered with one another. In other words, string 180b is defined such that its width is sufficient to ensure that any transmission from an communications unit 40 from string 180a transmitting with a certain set of radio transmission parameters will not be received by any communications unit 40 from string 180c set to receive transmissions using the same set of radio transmission parameters. Those skilled in the art will understand that there are many transmission parameters that can be adjusted in this regard, including the non limiting examples of frequencies, time slots, power, methods of modulation, directional antenna gain, physical spacing of units and strings, etc.

Furthermore, while three strings 180 are depicted to indicate possible transmission paths, system 100 can comprise any number of strings. The number of strings for any given group of transmissions is dependent on the system requirements. For example, rather than multiple strings, each communications unit 40 in an array 140 may be utilized in a single transmission path such that the entire array 140 might be considered a "string" for purposes of the description. Those skilled in the art will understand that the number of transmission paths and the number of acquisition units utilized for any given transmission may constantly be in flux to maximize the operation requirements for a particular transmission or group of transmissions.

In one preferred embodiment, the transmitted signal strength of a wireless communications unit 40 can be altered to adjust the transmission range for a transmitting communications unit 40 such that number of potential receiving communications units 40 can be controlled. In this regard, rather than utilizing multiple transmitter/receivers within an individual network for short and midrange transmission, communications unit 40 may have a single transmitter/receiver that can be toggled between a short-range transmission power and mid-range transmission power.

At least one and preferably a plurality of seismic acquisition systems 110 in network 100 are proximately located to control station 160 so that network 100 can utilize mid-range radio frequency to transmit timing signals from control station 160 to the seismic acquisition systems 110. Alternatively, data may be transmitted from the seismic acquisition systems 110 to control station 160. In one embodiment, a plurality of wireless communications units 40 can simply relay a signal to control station 160 without regard to, or even a need for, an associated seismic acquisition unit 12. In another embodiment of the invention, data is accumulated and stored at multiple, dispersed concentrators 200 remote from control station 160. Concentrators 200 are located in the proximity, i.e., line-of-sight, of the communications units 40 of the network 100 so that the network 100 can utilize low power, mid-range radio transmission to transmit data to the concentrators 200. The concentrators 200, in-turn, can store the data or transmit it back as desired to control station 160. In one embodiment, concentrators locally store seismic data but transmit quality control data received from the acquisition units back to control station 160. Likewise, concentrators 200 may be used as way-points in the transmission of control and timing signals out to the network 100.

Much like the individual communications units 40, each concentrator 200 preferably also has a transmission range 260 that encompasses several wireless communications units 40. As within the array 140, transmission of data from a string 180 to the concentrator 200 may be made from a plurality of units 40. For example, concentrator 200a has an omnidirectional transmission range 260a. Falling within the transmission range 260a of concentrator 200a are wireless communications units 40h-40j. As such, any of wireless communications units 40h-40j may transmit seismic data from string 180a to concentrator 200a. Thus, a failure of one of the communications units, such as 40h, would not prevent data from string 180a from being passed up the line or communications signals from being passed down the line. Rather, the transmission path from string 180a to concentrator 200a, or vice-versa, would simply be rerouted through an operative communications unit, such as units 40*i* or 40*j*. Concentrators 200 may also be positioned so as to be within the mid-range transmission distance of adjacent concentrators.

As described above, network 100 can function either as a one-way network, i.e., concentrators 200 are utilized only to receive data transmitted from array 140 or concentrators 200 are used to transmit a timing or control signal out to array 140, or a two-way network, i.e., concentrators 200 transmit command signals out to array 140 in addition to receiving data transmitted from array 140.

Transmissions to control station 160 from concentrators 200 or communications units 40 may also include GPS or other survey information to establish the location of a particular unit 12 for purposes of the shot and for purposes of retrieval. This is particularly desirable for wireless units as described herein since it may be difficult to locate such units upon retrieval. GPS survey information may also be useful in selection of a transmission path within an array as described above.

In operation, a preferred transmission path may be preset in units 40 or predetermined. Likewise, alternate transmission paths may be preset in units 40 or predetermined. These preset paths, as well as the number of paths required for a particular array 140, are determined based on the volume of the data to be transmitted, the data transmission rates, signal strength and the number of "real time" radio channels having different transmission parameters such that the radio transmission channels are non-interfering, battery power, location of the unit, etc.

Prior to a transmission or a set of transmissions along a string, a beacon signal may be utilized to verify the preferred transmission path in much the same way as an ad hoc network or peer to peer network identifies systems within the network. Alternatively, rather than transmitting utilizing a preset or predetermined path, the beacon signal may be used to establish a transmission path utilizing the above described parameters. If a beacon signal is transmitted and the preferred transmission path is not available, system 100 will search for another transmission path through the wireless communication units. In one embodiment, the beacon signal is transmitted and the local wireless communications units within range send a return signal acknowledging their receipt of the beacon signal. Once a path is verified or established, as the case may be, the path may be "locked in" for purposes of the particular transmission so that system 100 will not continue searching for another path. The beacon signal may be generated from within the array 140 by the seismic unit systems themselves or initiated by the control station or concentrator.

As mentioned above, one benefit of the invention is the ability to utilize flexible transmission paths that can be readily changed based on various internal and external parameters effecting the network. This flexibility also renders the network itself much more reliable. Preferably, transmission paths can be established and/or rerouted on-the-fly based on these parameters. Another advantage of the system is that it utilizes less power in transmitting a signal over a given distance via multiple short transmissions than would be required of a single transmission over the same distance. In other words, because the power required to transmit a signal decreases as one over the square of the transmission distance, it is much more optimal to transmit a signal in several short hops than it would be to transmit the same signal over the same distance in a single hop. This is true even of low power, mid-range transmissions. Of course an additional advantage of the system of the invention is that it may avoid the need to acquire high power radio transmission licenses. Finally, unlike the prior art, the system of the invention eliminates the need to physically locate a concentrator or similar device in the middle of a seismic array, nor utilize the concentrator to sort and organize multiple seismic data transmissions incoming directly from individual seismic acquisition systems.

Turning back to the individual seismic acquisition units as illustrated in FIG. 1, each seismic unit 12 is preferably wireless and requires no external cabling for data transmission, timing or unit control. Each seismic unit 12 may contain a power source 16, such as a battery, a short-range radio transmitter/receiver 18/20, control electronics, which may include, without limitation, a local clock, local memory for storing seismic data, and a processor housed within a casing 14. A geophone package 22 may be housed within the casing 14 or externally attached thereto. Further, because the unit 12 need only transmit a short range signal, power requirements for the unit are minimized, in contrast to the increased power requirements necessary to transmit a stronger signal to a more distant receiving device. By reducing the memory requirements, the transmission requirements and the battery requirements, the overall cost, as well as the physical size and weight, of each unit is minimized.

While certain features and embodiments of the invention have been described in detail herein, it will be readily understood that the invention encompasses all modifications and enhancements within the scope and spirit of the following claims.

What is claimed is:

1. A method of performing seismic exploration, comprising:
    providing a self-contained wireless seismic acquisition unit including a first short-range transceiver and a geophone, the self-contained wireless seismic acquisition unit configured to detect seismic energy using the geophone;
    providing a wireless communications unit having a mid-range transceiver and a second short-range transceiver;
    supporting the wireless communications unit with a support structure;
    receiving, by the mid-range transceiver via a mid-range radio transmission having a first set of parameters, a control signal from a transmission station; and
    transmitting, by the second short-range transceiver of the wireless communications unit via a short-range transmission with a second set of parameters, information based on the control signal to the first short-range transceiver of the self-contained wireless seismic acquisition unit, at least one parameter of the second set of parameters being different from the first set of parameters.

2. The method of claim 1, further comprising:
    transmitting the information from the second-short range transceiver to the first short-range transceiver via an IEEE wireless protocol.

3. The method of claim 1, further comprising:
    transmitting the information from the second short-range transceiver to the first short-range transceiver via a wireless personal area network.

4. The method of claim 1, further comprising:
    using a 2.4 GHz radio frequency band to transmit the information from the second short-range transceiver to the first short-range transceiver via an IEEE wireless protocol.

5. The method of claim 1, further comprising:
using a 5.8 GHz radio frequency band as indicated by an IEEE wireless protocol to transmit the information from the second short-range transceiver to the first short-range transceiver.

6. The method of claim 1, further comprising:
transmitting, via the mid-range transmission, the control signal from the transmission station to the mid-range transceiver using an IEEE wireless protocol.

7. The method of claim 6, wherein the mid-range transmission comprises at least one of a 2.4 GHz frequency band and a 5.8 GHz frequency band.

8. The method of claim 1, further comprising:
transmitting the control signal from the transmission station to the mid-range transceiver via the mid-range radio transmission using the first set of parameters, the mid-range transmission consuming more power than the short-range transmission.

9. The method of claim 1, further comprising:
engaging the support structure with a spike to support the wireless communications unit in position on a ground surface.

10. The method of claim 9, further comprising:
deploying the spike in the ground surface prior to engaging the support structure with the spike.

11. The method of claim 9, further comprising:
electrically coupling the wireless communications unit to a power source mounted on the support structure.

12. The method of claim 1, further comprising:
deploying a plurality of seismic acquisition units and a plurality of wireless communications units to form an array, each of the plurality of seismic acquisition units capable of wirelessly coupling to at least one of the plurality of wireless communications units; and
identifying a plurality of transmission paths between the transmission station and at least one of the plurality of wireless communications units.

13. The method of claim 1, wherein the second short-range transceiver and the mid-range transceiver are a same transceiver, comprising:
toggling the same transceiver between mid-range transmission capability and short-range transmission capability.

14. The method of claim 1, comprising:
deploying the self-contained wireless seismic acquisition unit at a first location;
deploying the wireless communication at a second location between two and 50 feet from the first location.

15. A system to perform seismic exploration, comprising:
a wireless seismic acquisition unit having a first short-range transceiver and a geophone;
a wireless communications unit having a mid-range transceiver and a second short-range transceiver;
an elongated support structure having an end configured to engage a surface of the ground, the elongated support structure configured to support the wireless communications unit;
the mid-range transceiver configured to receive, via a mid-range radio transmission with a first set of parameters, a control signal from a transmission station; and
the second short-range transceiver configured to transmit, via a short-range transmission with a second set of parameters, information based on the control signal to the first short-range transceiver of the self-contained wireless seismic acquisition unit, at least one parameter of the second set of parameters being different than the first set of parameters.

16. The system of claim 15, comprising:
the second-short range transceiver configured to transmit the information to the first short-range transceiver via an IEEE wireless protocol.

17. The system of claim 15, comprising:
the second-short range transceiver configured to transmit the information to the first short-range transceiver via a wireless personal area network.

18. The system of claim 15, comprising:
the second-short range transceiver configured to use a 2.4 GHz radio frequency band to transmit the information to the first short-range transceiver via an IEEE wireless protocol.

19. The system of claim 15, comprising:
the second-short range transceiver configured to use a 5.8 GHz radio frequency band to transmit the information to the first short-range transceiver via an IEEE wireless protocol.

20. The system of claim 15, comprising:
the mid-range receiver configured to receive, via an IEEE wireless protocol, the mid-range transmission having the control signal transmitted from the transmission station.

* * * * *